United States Patent
Oheim et al.

(10) Patent No.: US 11,644,422 B2
(45) Date of Patent: May 9, 2023

(54) CALIBRATION STANDARD FOR EVANESCENCE MICROSCOPY

(71) Applicants: CENTRE NATIONAL DE LA RECHERCHE SCIENTIFIQUE (CNRS), Paris (FR); UNIVERSITE DE PARIS, Paris (FR); UNIVERSITE BAR-ILAN, Ramat Gan (IL)

(72) Inventors: Martin Oheim, Palaiseau (FR); Adi Salomon, Tel Aviv (IL)

(73) Assignees: CENTRE NATIONAL DE LA RECHERCHE SCIENTIFIQUE (CNRS), Paris (FR); UNIVERSITE DE PARIS, Paris (FR); UNIVERSITE BAR-ILAN, Ramat Gan (IL)

( * ) Notice: Subject to any disclaimer, the term of this patent is extended or adjusted under 35 U.S.C. 154(b) by 0 days.

(21) Appl. No.: 17/275,409

(22) PCT Filed: Sep. 12, 2019

(86) PCT No.: PCT/EP2019/074431
§ 371 (c)(1),
(2) Date: Mar. 11, 2021

(87) PCT Pub. No.: WO2020/053367
PCT Pub. Date: Mar. 19, 2020

(65) Prior Publication Data
US 2022/0178828 A1   Jun. 9, 2022

(30) Foreign Application Priority Data

Sep. 12, 2018  (EP) ..................... 18306193

(51) Int. Cl.
*G01N 21/64* (2006.01)
*G02B 21/16* (2006.01)

(52) U.S. Cl.
CPC ....... *G01N 21/6458* (2013.01); *G01N 21/648* (2013.01); *G02B 21/16* (2013.01);
(Continued)

(58) Field of Classification Search
CPC ....... G01N 21/648; G01N 2201/12746; G01N 2021/6439; G02B 21/16
See application file for complete search history.

(56) References Cited

U.S. PATENT DOCUMENTS

| 2003/0143751 A1* | 7/2003 | Corson ................ G01N 21/274 702/22 |
| 2004/0005243 A1 | 1/2004 | Mulhern et al. |

(Continued)

FOREIGN PATENT DOCUMENTS

WO   WO 2008/125855 A1   10/2008

OTHER PUBLICATIONS

Saffarian et al. Differential evanescence nanometry: Live-cell fluorescence measurements with 10-nm axial resolution on the plasma membrane, Biophysical Journal vol. 94, No. 6, pp. 2333-2342 (Year: 2008).*

(Continued)

*Primary Examiner* — David P Porta
*Assistant Examiner* — Fani Polyzos Boosalis
(74) *Attorney, Agent, or Firm* — Oblon, McClelland, Maier & Neustadt, L.L.P.

(57) ABSTRACT

A calibration standard for determining an intensity decay related to an evanescent field generated close to the interface between a sample to be tested and a substrate on which the sample is to be deposited, preparation and analysis methods and use thereof.

24 Claims, 5 Drawing Sheets

(52) U.S. Cl.
CPC ............. *G01N 2021/6439* (2013.01); *G01N 2201/12746* (2013.01)

(56) References Cited

U.S. PATENT DOCUMENTS

2008/0314114 A1* 12/2008 Feke ............... G01N 21/6456
73/1.01
2013/0126757 A1* 5/2013 Sywe ............... G01N 21/6458
250/459.1

OTHER PUBLICATIONS

Fujifilm Electronic Materials U.S.A., Inc. Durimide® 200 Pre-imidized Polyimide Technical Product Information, 5 pages (Year: 2012).*

International Search Report and Written Opinion dated Jan. 27, 2020 in PCT/EP2019/074431 filed on Sep. 12, 2019.

Extended European Search Report dated Dec. 20, 2018 in European Patent Application No. 18306193.6 filed on Sep. 12, 2018, 12 pages.

Balaa, K. et al., "Live cell imaging with Surface Plasmon-Mediated Fluorescence Microscopy," SPIE-OSA, vol. 7367, 736710, 2009, pp. 1-8, XP040498068.

Unno, N. et al., "Fabrication of calibration plate for total internal reflection fluorescence microscopy using roll-type liquid transfer imprint lithography," Microelectronic Engineering, MEE 10613, 2017, pp. 1-24, 25 total pages, XP085116745.

Niederauer, C. et al., "Direct characterization of the evanescent field in objective-type total internal reflection fluorescence microscopy," Optics Express, vol. 26, No. 16, 2018, pp. 20492-20506, XP055530356.

Steyer, J. A. et al., "Tracking Single Secretory Granules in Live Chromaffin Cells by Evanescent-Field Fluorescence Microscopy," Biophysical Journal, vol. 76, 1999, pp. 2262-2271, XP055530215.

Wu, J. et al., "A New Method for Axial Decay Function Calibration of Evanescent Field in Multi-Angle Total Internal Reflection Fluorescence Microscopy," Journal of Physics: Conference Series, vol. 680, 012025, 2016, pp. 1-5, 6 total pages, XP055530141.

* cited by examiner

CALIBRATION STANDARD FOR
EVANESCENCE MICROSCOPY

TECHNICAL DOMAIN AND PRIOR ART

The technique of fluorescence microscopy has become an essential tool in biology and the biomedical sciences, as well as in materials science due to its specificity and background rejection that are not readily available with other contrast modes of traditional optical microscopy. The application of an array of fluorochromes has made it possible to identify cells and sub-microscopic cellular components with a high degree of specificity amid non-fluorescing material. In fact, the fluorescence microscope is capable of revealing the presence of a single molecule. Through the use of multiple fluorescence labeling, different probes can simultaneously identify several target molecules and follow them at the same time.

The principle of functioning of a fluorescence microscope is to irradiate the specimen with a desired and specific band of wavelengths, and then to separate the much weaker emitted fluorescence from the excitation light and potential instrument and sample autofluorescence. Typically, for a sample to be suitable for fluorescence microscopy it must be fluorescently labelled. There are several labeling methods; the main techniques are labelling with small-molecule chemical fluorescent dyes or, in the case of biological samples, expression of a fluorescent protein. Alternatively, the intrinsic fluorescence of a sample (i.e., autofluorescence) can be used, however, the latter is dimmer and spectrally larger and hence it is more easily confounded with instrument fluorescence or other background.

In fluorescence microscopy, elimination of background fluorescence from outside the focal plane can dramatically improve the signal-to-noise ratio, and consequently, the spatial and spectral resolution of the features or events of interest. Increasing spatial resolution is especially important in biological microscopy, where achieving isotropic (i.e., in xyz) nanometric resolution is of interest for the study of the near-membrane space, particularly the study of vesicular trafficking and cellular signaling.

Various fluorescence microscopy techniques have been developed to restrict the excitation and detection of fluorophores to a thin region of the specimen. Among them, evanescent-wave microscopies offer an axial filtering of approximately 100 nm using either excitation confinement (i.e. reducing the volume fraction of the cell in which fluorescence is excited), like in total internal reflection (TIR), or emission selectivity like in supercritical angle fluorescence (SAF) microscopy.

Total internal reflection (TIRF) fluorescence microscopy achieves sub-diffraction axial sectioning by confining fluorescence excitation to a thin layer close to the cell/substrate interface. However, the exact thickness of this light sheet is difficult to measure and large deviations from the calculated exponential intensity decay of the evanescent wave have been reported. This leads to large inaccuracies in statements of light confinement at the reflecting interface, and consequently, in fluorescence intensities. Worse, the quantitative interpretation of fluorophore concentration changes, axial distances or single-particle trajectories is flawed by large error bars or simply wrong.

Although several techniques for calibrating the evanescent-wave penetration intensity decay have been proposed, existing devices for calibrating evanescent-wave decays are home-build and hence user-dependent. Indeed, there is currently no method that would permit a comparison of instrument quality, data, and scientific results across images, experiments and laboratories. In the absence of a simple and versatile solution, many authors have resorted to using the theoretical (calculated) penetration depth, (which is wrong, as evidenced by a number of publications) or else work in a semi-quantitative manner that uses TIRF only as a technique for contrast enhancement.

SUMMARY OF THE INVENTION

The aim of the invention is to overcome all or parts of the above-mentioned drawbacks.

According to a first aspect, the invention provides a calibration standard mimicking a dielectric substrate (e.g., a microscope slide) and a test sample (e.g., a cell) to be tested by evanescent fluorescence microscopy.

Desirably, said calibration standard improves quantitative measurements of the evanescence field thickness generated close to the sample/dielectric substrate interface during total internal reflection fluorescence and thereby quantifying nanometric axial fluorophore distance. The calibration standard equally serves in supercritical angle fluorescence assays by providing a calibration standard presenting fluorescent emitter material (e.g. molecular fluorophores or molecular fluorophore aggregates) at a controlled and known distance from the microscope slide.

More specifically, the invention provides a calibration standard for determining an information related to an evanescent field generated close to the interface between a sample to be tested and a substrate on which said sample is to be deposited, said calibration standard comprising
at least one layered structure stacked on a dielectric substrate, said layered structure comprising at least one spacer layer and at least one fluorescent emitter layer containing at least a fluorescent emitter material;
wherein said dielectric substrate is of a higher refractive index than the at least one spacer layer;
wherein at least one spacer layer is stacked on said dielectric substrate, the interface between said dielectric substrate and said at least one spacer layer mimicking an interface between a dielectric substrate and a sample to be tested; and
wherein said at least one fluorescent emitter layer is arranged at a fixed controlled distance (z) of said interface.

In an embodiment, the calibration standard contains a plurality of fluorescent emitter layers stacked one upon the other and each spaced apart by at least one spacer layer, said fluorescent emitter layers being at different fixed controlled distance (z) of said interface, said fluorescent emitter layers having different excitation and/or emission wavelengths.

In other terms, said calibration standard comprising one layered device stacked on a dielectric substrate, the interface between said dielectric substrate and said layered device mimicking an interface between the dielectric substrate and a sample to be tested,
the layered device presents on said dielectric substrate a surface S and comprises:
a series of layered structures stacked on the dielectric substrate, one above to the other,
each layered structure comprising: one spacer layer, and on top one fluorescent emitter layer containing at least one fluorescent emitter material;
said dielectric substrate is of a higher refractive index than the spacer layers;
a first spacer layer being in contact with the said dielectric substrate, to present a flat surface on which the stack of the layered structures is deposited; the first spacer layer is to pretreat the surface, and a final emitter layer being covered with a final protective layer, wherein:

each layer has a constant (or homogeneous) thickness over the surface S; in other terms, in the present invention, the axial position z of the layer are very accurate, the thickness of each layer stacked on other layer is constant and is positioned at the same location along the z axis over the entire surface S; thus the invention allows to determine precisely the intensity at the axial position z, each fluorescent emitter layer is arranged at a fixed controlled axial distance (z) of said interface, each fluorescent emitter differs in at least one fluorescence parameter between said layered structures, and each fluorescent emitter layer comprises at least one fluorescent emitter material having at least one fluorescence parameter different from the fluorescent emitter material of another fluorescent emitter layer: emission wavelengths, emission directionality, emission polarizabilities or fluorescence lifetimes, so that each fluorescent emitter layer has a specific fluorescence parameter at a fixed controlled axial distance (z) of the interface, at a common excitation wavelength, to determine the evanescent field axial intensity decay from the combination of these specific fluorescence parameters measured at different controlled axial distances (z) of the interface.

Advantageously, the thickness of the series of the layered structures is of the same length scale as the evanescent-field intensity decay; in other terms, the thickness is commensurable with the length of the evanescent-field intensity decay.

It means for instance that the thickness of the series of the layered structures can be on axial distance between the maximum of the evanescent-field intensity and a given intensity of the evanescent-field intensity (for instance equal to 5% of the maximum of the evanescent-field intensity; or beyond the minimum intensity but near the minimum intensity).

Advantageously, each fluorescent emitter layer has an excitation spectrum permitting excitation at the same excitation wavelength, so that each fluorescent emitter layer has a specific spectral intensity at a fixed controlled axial distance (z) of the interface, at a common excitation wavelength, to determine the evanescent field axial intensity decay from the combination of these specific spectral intensities measured at different controlled axial distances (z) of the interface.

Advantageously: each fluorescent emitter layer presents a constant (or homogeneous) fluorophore concentration over the surface S, and each spacer layer presents a constant (or homogenous) refractive index over the surface S.

In an embodiment, an intermediate capping layer is deposited between each emitter layer and each adjacent spacer layer.

Advantageously, each layer is deposited by:
spin coating; or
Layer By Layer (LBL) deposition; or
sputtering.

Thus, advantageously, the layers of the calibration standard are thin layers.

Advantageously, the layered device has a thickness (d) between 400 nm and 5 micrometers.

Advantageously, the more a fluorescent emitter layer is distant from the interface, the more this emitter layer is fluorescent.

Advantageously, the said fluorescent emitter material is chosen from the list:
organic fluorophores;
quantum dots;
carbon dots.

The following fluoropolymers can be used:
Poly(2,2,3,3,3-pentafluoropropylmethacrylate), solvent: tetrahydrofuran, dichoromethane
Poly(1,1,1,3,3,3-hexafluoroisopropyl acrylate) solvent: anisole
my-133-MC® (company-mypolymers, Nes ziona, Israel-document attached) solvent: Novec 7500 (2-(Trifluoromethyl)-3-Ethoxydodecafluorohexane)/Novec 7100 (methoxyperfluorobutane) (both company-3M, USA-msds attached); the polymer MY133s a fluoropolymer and the solvent category is a hydrofluoroether.
LOW RI polymers, as defined in this web-link: www.sigmaaldrich.com/technical-documents/articles/materials-science/organic-electronics/refractive-index-coatings (last access dated on September 12)
Others ionic crystals with RI<1.37
Sodium fluoride, RI=1.326
Potassium fluoride, RI=1.36
Na3AlF6-Cryolite, RI=1.338 in ~600 nm.

In an embodiment, the at least one spacer layer is made of an optical-grade polymer or inorganic transparent material with a refractive index ranging between 1.3 and 1.8, preferably 1.3 and 1.6, even more preferably 1.33 to 1.51.

For example, biological samples are complex mixtures of carbohydrates, proteins, lipids and nucleic acids having an average refractive index typically of 1.35-1.38, locally ranging from 1.33 to 1.51, with large heterogeneity on a sub-micrometric scale.

Further, the invention proposes a method to manufacture such a calibration standard.

Further, according to another aspect, the invention proposes a method using the calibration standard of the invention to quantify the evanescent field generated close to a test sample/dielectric substrate interface during total internal reflection fluorescence or supercritical angle fluorescence assays.

In particular, the invention proposes a method for determining an information related to an evanescent field generated close to an interface between a sample to be tested and a dielectric substrate on which said sample is to be deposited, and/or for adjusting said information; said method comprising:

a) providing at least one calibration sample, b) placing said calibration standard on a microscope stage, c) illuminating said calibration standard at a given wavelength (λ) and a given angle of incidence (θ(2)), and d) detecting the emission of the at least one fluorescent emitter material contained in the at least one fluorescent emitter layer, said detection being used for the determination of an information related to said evanescent field.

The method proposed also allows to obtain an axial intensity profile of the evanescent field generated close to a test sample/dielectric substrate interface during total internal reflection fluorescence or supercritical angle fluorescence assays by plotting the interrelation between the known distance (z) of the at least one fluorescent emitter layer in the calibration standard and the measured value of a fluorescence parameter of said fluorescent emitter layer detected emission.

It further allows determining the distance (z) of an fluorescent emitter material by using an axial intensity profile obtained as mentioned above.

An advantage of the method of invention is that it can be easily reproduced across experiments on the same microscope or reproduced on another microscope. This desirably advances the standardization and the comparison of instrument quality, data, and scientific results across images, experiments and laboratories.

Further, the invention allows estimating the corresponding thickness of the fluorescence excitation layer from the cell side of the cell/substrate interface. Of course, the microscopy operator may, by iteration, adjust the TIR or SAF microscopy input parameters such as to reach the desired penetration depth.

Context and Definitions

In the present invention, the following terms have the following meanings:
The Thickness is the Axial Dimension of the Layers Along the Axis z.

Total internal reflection (TIR) refers to the change in direction of a light wavefront at an interface between two different dielectric media so that the wavefront returns into the medium from which it originated. TIR is only possible in situations in which the propagating light encounters a boundary to a medium of lower refractive index. Its refractive behavior is governed by Snell's Law: $n(1) \times \sin \theta(1) = n(2) \times \sin \theta(2)$ where $n(2)$ is the higher refractive index and $n(1)$ is the lower refractive index. The angle of the incident beam, with respect to the normal to the interface, is represented by $\theta(2)$, while the refracted beam angle within the lower-index medium is given by $\theta(1)$. When light strikes the interface of the two materials at a sufficiently high angle, termed the critical angle ($\theta(c)$), the refracted beam propagates parallel to the interface (90 degrees relative to the normal), and, at larger angles, all light is reflected entirely back into the first medium. Applying the equation to a typical biological investigation of cell membrane processes, the refractive index of the microscope slide or coverslip is represented by $n(2)$ (approximately 1.5), while $n(1)$ represents the refractive index of the aqueous buffer solution or cytoplasmic components (approximately 1.33 to 1.38). With $n(2)$ greater than $n(1)$, when $\theta(2)$ exceeds the critical angle $\theta(c)$, total internal reflection occurs within the glass medium. At the critical incidence angle, refraction occurs at 90 degrees ($\sin \theta(1) = 1$), and Snell's Law reduces to $n(2) \times \sin \theta(c) = n(1)$ or $\sin \theta(c) = n(1)/n(2)$ and therefore, the critical angle can be expressed as $\theta(c) = \sin^{-1}[n(1)/n(2)]$. At all angles greater than the critical angle, total internal reflection occurs, in which essentially all of the light is reflected back into the first medium. Although no far-field light passes into the second medium when it is incident at angles greater than the critical angle, the reflected light generates a highly restricted electromagnetic (near-) field adjacent to the interface, in the lower-index medium. This field is termed the evanescent field, and within a limited region near the interface, it is capable of exciting fluorophores or other fluorescence emitting material. The range over which excitation is possible is limited by the exponential decay of the evanescent wave energy in the z direction (perpendicular to the interface). The following equation defines this energy as a function of distance from the interface $E(z) = E(0)\exp(-z/d)$; where $E(z)$ is the energy at a perpendicular distance z from the interface, and $E(0)$ is the energy at the interface. The penetration depth ($\delta$) is dependent upon the wavelength of the incident illumination ($\lambda(i)$), the angle of incidence, and the refractive indices of the media at the interface, according to the equation:

$\delta = \lambda(i)/4\pi \times (n(2)^2 \sin^2\theta(2) - n(1)^2)^{-1/2}$.

Total internal reflection fluorescence (TIRF) microscopy refers to a microscopy technique that takes advantage of the fluorescence excitation confinement due to the exponential decay of evanescent field generated by total internal reflection. As mentioned above, several crucial factors govern the utilization of the evanescent wave in TIR microscopy. For total internal reflection to occur and produce an evanescent field, the refractive index of the substrate medium must be greater than that of the specimen medium ($n(2)$ greater than $n(1)$), and the angle of incidence ($\theta(2)$) must be greater than the critical angle ($\theta(c)$). The incident illumination wavelength affects both the penetration depth of the evanescent wave and the specific fluorophores that are excited, which must have appropriate absorption parameters in the wavelength band of the illuminating light. The implication of the wavelength effects combined with the fact that the energy of the evanescent wave decreases exponentially in the z direction, is that highly specific fluorescent excitation can be induced in a very thin optical section, typically less than 100 nanometers in thickness.

Figure 1:
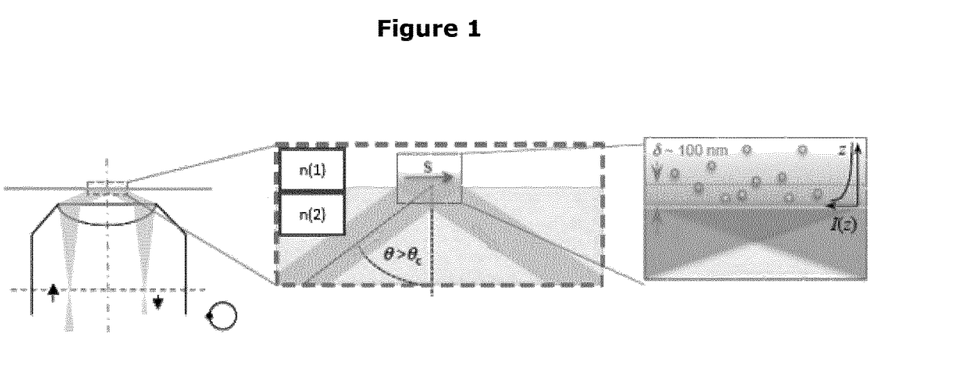
FIG. 1, already discussed, is a schematic view, schematic representation of the commonly used objective-type TIRF configuration.

An objective-type TIRF microscope has been illustrated on FIG. 1.

Here, a laser beam is focused in an eccentric position in the back-focal plane of a high-numerical aperture (NA) objective (dashed, see inset image) generating an oblique beam impinging at the dielectric interface ($n(2) > n(1)$).

For incident beam angles exceeding the critical angle $\theta(c)$, the beam is totally reflected at the interface (image in the middle). As a consequence, an 'evanescent' wave is set up in the medium $n_1$ and propagates along the surface (the Pointing vector S is in +x direction for a beam impinging from the left) and its intensity decays exponentially in axial direction with a length constant of the order of 100 nm for a glass/water interface (image on the right).

Alternatively, TIRF microscopy may be implemented using another prism geometry, in which an external prism is used to guide the light at an oblique angle to the reflecting interface and scattered excitation light (TIR) or fluorescence (TIRF) are detected from the far end, with an air or dipping objective.

Figure 2:
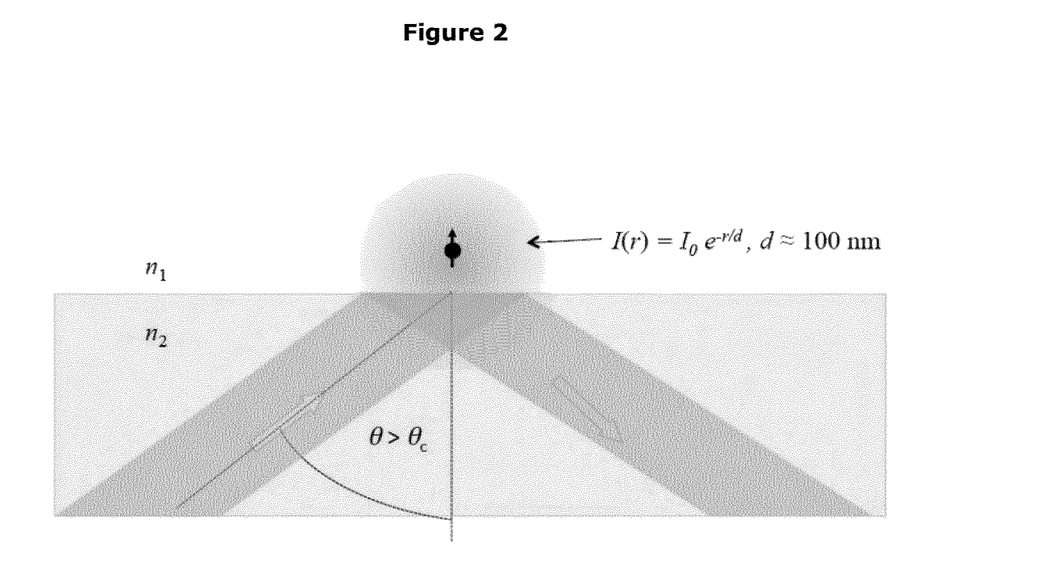
FIG. 2, also already discussed, is a schematic representation of fluorescent emitter emission in supercritical angle fluorescence.

Supercritical Angle Fluorescence (SAF) microscopy refers to a microscopy technique based on fluorophore emission selectivity or evanescence in emission. Indeed, fluorophores may be regarded as dipolar nano-antennas that, when excited, emit an evanescent electromagnetic field that consists of both near- and far-field components. Normal fluorescence detection only captures the far-field emission. According to the same logic as above, the evanescent field generated by dipole radiation close to the fluorophore does not radiate in a homogeneous environment. However, when an interface is present within this evanescent field, a portion of the evanescent field can couple to the interface and it becomes propagative. For instance, at the interface between water and glass, this emission is transmitted into the glass in directions beyond the critical angle. Thus, while all fluorophores, irrespective of their surface distance, can emit subcritical emission, only the fluorophores located in the immediate vicinity of the interface have such supercritical emission. This light sometimes referred to as «forbidden light» (because it does not satisfy the Snell-Descartes law) may represent up to 50% of the light transmission into the glass. This supercritical emission decreases very rapidly with the distance to the interface (approximately exponential) and may be used to derive the axial location of the emitting fluorophores. Current commercial microscope objective with very high numerical apertures NA>n(1) can collect part of this supercritical light. A schematic representation of directional emission from a near-interface fluorescent emitter in supercritical angle fluorescence has been illustrated on FIG. 2.

Fluorescent emitter material refers to any organic or inorganic species that emit fluorescence. Fluorescent emitters may be divided into several major classes.

Molecular fluorophores, also termed "small-molecule fluorophores" or "dyes" comprise either natural synthetic low molecular organic molecules of 20-100 atoms (200-1000 Dalton) with various core structures including Xanthene derivatives such as fluorescein, rhodamine, Oregon green, eosin, Texas red and derivatives thereof; Cyanine derivatives such as cyanine, indocarbocyanine, oxacarbocyanine, thiacarbocyanine, and merocyanine and derivatives thereof; Squaraine derivatives and ring-substituted squaraines such as Seta, SeTau, Square dyes and derivatives thereof; Naphthalene derivatives including dansyl, prodan and derivatives thereof; Coumarin derivatives; Oxadiazole derivatives such as pyridyloxazole, nitrobenzoxadiazole and benzoxadiazole and derivatives thereof; Anthracene derivatives including anthraquinones derivatives, in particular DRAQ5, DRAQ7 and CyTRAK Orange and derivatives thereof; Pyrene derivatives including cascade blue; Oxazine derivatives including Nile red, Nile blue, cresyl violet, oxazine 170 and derivatives thereof; Acridine derivatives including proflavin, acridine orange, acridine yellow and derivatives thereof; Arylmethine derivatives including auramine, crystal violet, malachite green and derivatives thereof; Tetrapyrrole derivatives including porphin, phthalocyanine, bilirubin and derivatives thereof. Examples of molecular fluorophores particularly used in fluorescence microscopy are meso-tetraphenylporphyrin tetrasulfonate ($TPPS_4$) and meso-tetraphenylporphyrin trisulfonate ($TPPS_3$), 5-TAMRA (5-Carboxytetramethylrhodamine), Rhodamine b, Calcein, rubpy2cl2, Pyranine, Calcofluor white, Bis(2,2'-bipyridine)-4'-methyl-4-carboxybipyridine-ruthenium N-succinimidyl ester-bis(hexafluorophosphate) and Congo red.

Molecular fluorophores aggregates are formed by highly ordered assembly of molecular fluorophores. The spectroscopic properties of molecular fluorophore aggregates are different from that of single or disordered molecular fluorophores. Depending on the molecular orientation in the aggregate, J—aggregate and H—aggregate are formed. In J—aggregate the molecules are aligned in a head to tail arrangement. J—aggregates are characterized by a sharp band, red shifted with respect to the monomer and by a strong photoluminescence with almost zero stokes shift. On the other hand, in H—aggregate molecular alignment is side-by-side. An example of molecular fluorophore aggregates is meso meso-tetra(4-sulfonatophenyl)porphine 3-aggregate (TPPS 3-aggregate).

Fluorescent proteins are a class of proteins that share the unique property of being self-sufficient to form a visible wavelength chromophore from a sequence of 3 amino acids within their own polypeptide sequence. Examples of such fluorescent proteins are, among many others, GFP (green), YFP (yellow) and RFP (red).

Fluorescent proteins can be attached to other specific proteins to form a fusion protein, synthesized in cells after transfection of a suitable plasmid carrier.

Fluorescent nanocrystals are larger, solid state nanoparticles generally characterized by low photobleaching and high quantum yields. For example, Quantum dots (QDs) are nanoscale semiconductor particles that generally exhibit a size-tunable, narrow emission spectrum (the emission peak shifts towards to the red with increasing particle size), a brighter emission than organic dyes, a broad excitation spectrum and excellent photostability. Moreover, they can absorb and emit photons ranging from the UV to IR. Carbon quantum dots (CDs) are a new class of fluorescent carbon nanomaterials, with the attractive properties of high stability, good conductivity, low toxicity, environmental friendliness, simple synthetic routes as well as comparable optical properties to quantum dots Fluorescent emitter materials are regarded as having a common excitation wavelength when they exhibit overlapping excitation spectra and roughly comparable molecular brightness. Advantageously, the excitation peak of fluorescent emitter materials having a common excitation wavelength differ by not more than 80 nm, more advantageously by not more of 50 nm. Advantageously, fluorescent emitter materials are regarded as having a different excitation wavelength when their excitation wavelength differ by more than 80 nm, more advantageously by not more of 50 nm.

Fluorescent emitter materials are regarded as having a distinct emission wavelength when they non-overlapping emission peaks. this does not necessitate non-overlapping emission spectra, but, advantageously, the emission peak of fluorescent emitter materials having an emission wavelength differ by more than 50 nm, more advantageously by more than 80 nm.

Dielectric refers to the property of an electrical insulating material that can be polarized by an applied electric field. When a dielectric is placed in an electric field, electric charges do not flow through the material as they do in a conductor, but only slightly shift from their average equilibrium positions causing dielectric polarization. A dielectric-dielectric interface, also termed dielectric interface, is an interface between two dielectric media.

Optical-grade transparent polymer refers to a transparent and non-emissive (i.e. non-fluorescent) polymer. In other terms such polymer material allows light to pass through so that objects behind can be distinctly seen and exhibits no autofluorescence. Optical-grade polymers have a refractive index between 1.3 and 1.8, preferably 1.3 and 1.6, more preferably between 1.33 and 1.51, even more preferably between 1.37 to 1.51 (i.e. similar to that of a biological sample such as a cell), examples are described in the table below:

| Chemical name | Repeat unit | Refractive index |
|---|---|---|
| Polydiallyldimethylammonium (PDDA) | [structure with pyrrolidinium ring, $N^+$, $Cl^-$]$_n$ | 1.48 |
| Poly(2,2,3,3,3-pentafluoropropyl methacrylate) (PFA) | [methacrylate structure with $CF_3$, $CH_3$]$_n$ | 1.395 |

-continued

| Chemical name | Repeat unit | Refractive index |
|---|---|---|
| Poly(1,1,1,3,3,3-hexafluoroisopropyl acrylate) | (F$_3$C, CF$_3$ structure) | 1.375 |
| Poly(2,2,3,3,3-pentafluoropropyl acrylate) | (F, F, CF$_3$ structure) | 1.389 |
| Poly methyl methacrylate (PMMA) | (structure) | 1.49-1.5 |
| Poly vinyl alcohol | (HO structure) | 1.475 to 1.49 |

DETAILED DESCRIPTION

One Fluorescent Emitter Layer.

According to a first embodiment, the calibration standard comprises one layered structure comprising one fluorescent emitter layer.

In this embodiment, the spacer layer stacked on the dielectric substrate (e.g., a microscope coverslip) has a thickness advantageously of 2 nm or more, 3 nm or more, 4 nm or more, 5 nm or more. More advantageously, the spacer layer stacked on the dielectric substrate has a thickness ranging between 5 and 30 nm, preferably between 5 and 20 nm, preferably between 5 and 15 nm.

In a specific embodiment, the fluorescent emitter layer comprises fluorescent emitter material stacked on a polymer layer. In this embodiment, the polymer layer on which the fluorescent emitter material is stacked acts as an underlayer whose thickness advantageously ranges between 0.5 nm to 2 nm and/or the thickness of the fluorescent emitter material layer advantageously ranges from 0.5 nm to 2 nm, preferably is about 1 nm. For example, the polymer layer acting as an underlayer may be made of made of PDDA.

Figure 3:
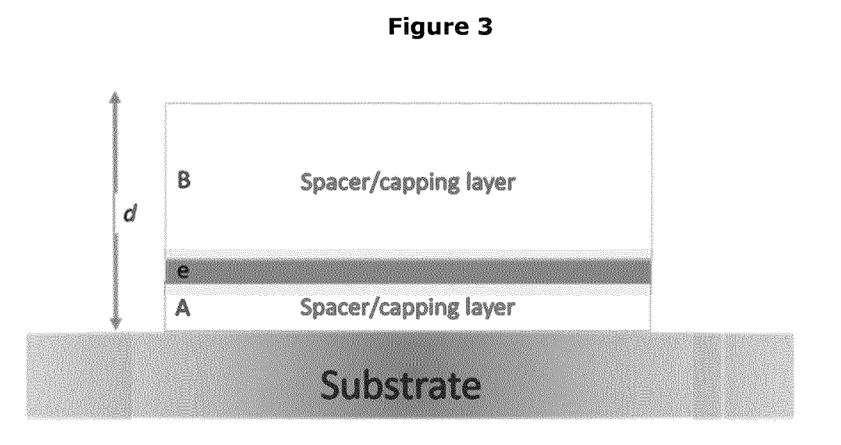
FIG. 3 is a schematic representation of a single fluorescent emitter layer calibration sample composed of a transparent polymer (A, B) and a photofluorescent emitter layer (e).

Such an embodiment is illustrated with reference to FIG. 3. The calibration standard includes a dielectric substrate (e.g. a microscope coverslip) having a surface. A layered structure is disposed on a portion of the surface. The layered structure comprises spacer layers (A, B) and a fluorescent emitter layer (e). The spacer layer (B) is acting as a final protective layer. Minimal thickness of A is of the order of 5-10 nm, and different samples can be realized having different thickness of A. B is about 4 nm, and B is about 600 nm. The dielectric substrate typically is a glass (e.g., borosilicate, BK-7) coverslip of about 170-µm thickness, but other materials and thicknesses may be required, depending on the very objective used.

In another specific embodiment, the fluorescent emitter material layer is embedded within said polymer layer and the thickness of the unique fluorescent emitter layer advantageously ranges between 200 and 1000 nm, preferably ranges between 200 and 800 nm. In this particular embodiment, the layered structure may or may not be covered with a spacer layer as a final protective layer.

Figure 4:
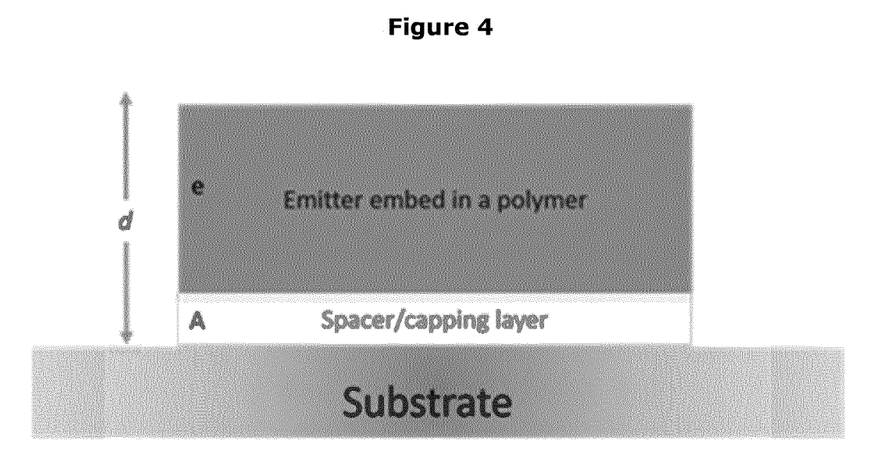
FIG. 4 is a schematic representation of a thick-fluorescent emitter layer calibration sample.

Such a calibration standard is illustrated on FIG. 4. It includes a dielectric substrate (e.g. a microscope coverslip) and a layered structure arranged on said substrate. The layered structure comprises a spacer layer A whose thickness ranges between 5 nm and 20 nm and a thick fluorescent emitter layer whose thickness is about 800 nm.

Other embodiments can further be contemplated. In particular, the calibration standard may comprise a plurality of layered structures arranged on the same substrate, each layered structure comprising one fluorescent emitter layer.

In this particular embodiment, the fixed controlled distance between the interface and said unique fluorescent emitter layer of each layered structure advantageously differs between said layered structures and the calibration curve is constructed from a series of measurements on these different layered structures.

Plurality of Fluorescent Emitter Layers.

According to another embodiment, the calibration standard comprises one layered structure comprising a plurality of fluorescent emitter layers.

In this embodiment, the fluorescent emitter layers are disposed at different fixed controlled distances (z) of said interface. More precisely, the fluorescent emitter layers are stacked one upon the other and each preferably spaced apart by at least one spacer layer. Advantageously, the fluorescent emitter layers are spaced apart by spacer layers whose thickness ranges between 10 and 100 nm, preferably between 30 and 50 nm.

In this embodiment, the thickness of the whole layered structure including spacer layers and fluorescent emitter layers ranges between 200 and 1000 nm, preferably ranges between 300 and 900 nm.

In this particular embodiment, the fluorescent emitter layers may have different excitation and/or emission wavelengths, i.e., fluorophore height is encoded by colour.

In an embodiment, the calibration standard may comprise many fluorescent emitter layers. Advantageously, the calibration standard may comprise up to 2, up to 3, up to 4, up to 5, up to 6, up to 7, up to 8, up to 9 or even up to 10 fluorescent emitter layers. For the environed application up to 6 fluorescent emitter layers are practical, and typically 3 may suffice.

Figure 5:
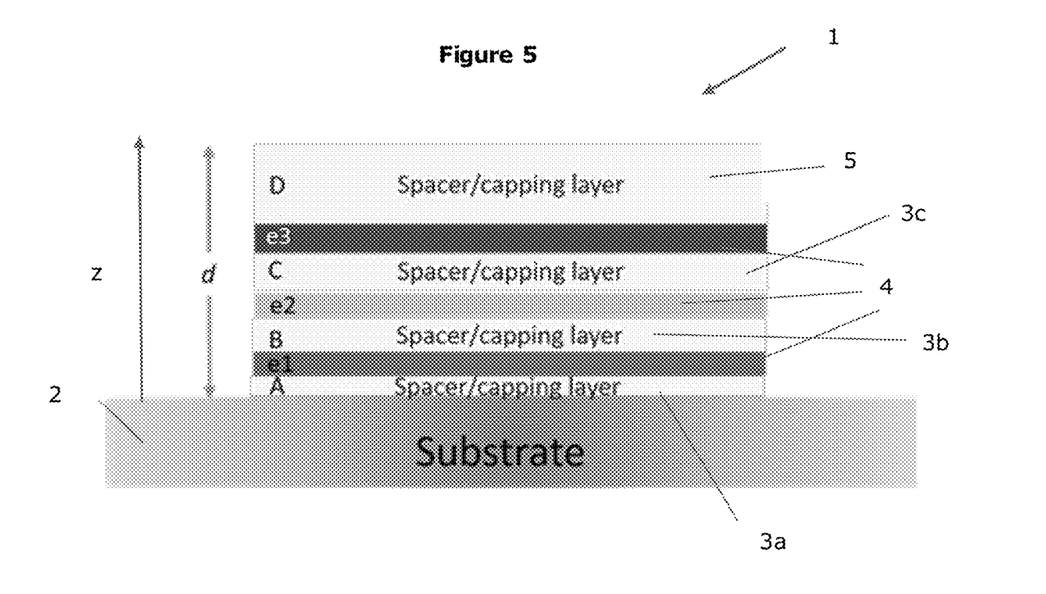
FIG. 5 is a schematic representation of two variants of a multi-fluorescent emitter calibration sample.

An example of such a multi-fluorescent emitters calibration sample 1 is illustrated on FIG. 5. it includes a dielectric substrate 2 (e.g. a microscope coverslip). A layered structure is arranged on a portion of the top surface of said substrate. The layered structure comprises spacer layers 3a-c (A, B, C) and 5 (D) wherein D is acting a final protective layer, with layer thickness of A ranging between 5 nm and 20 nm, B and C ranging between 10 nm and 100 nm, and D ranging between 400 nm and 800 nm, typically 500-600 nm. The fluorescent emitter layers 4 (e1, e2 and e3) have thicknesses about 2 nm-20 nm. The whole sample thickness, d, is about 800 nm-1000 nm. The fluorescent emitter layers 4 (e1, e2 and e3) have different excitation or emission spectra.

According to another embodiment, the calibration standard may comprise a plurality of layered structures arranged alongside each other, each layered structure comprising a plurality of fluorescent emitter layers.

Dielectric Substrate

Advantageously, the dielectric substrate is in the form of a layer, more advantageously a rectangular shaped layer, even more advantageously in the form of a microscope coverslip.

Advantageously, the thickness of the dielectric substrate ranges between 150 and 200 µm, more advantageously ranges between 160 and 190 µm, even more advantageously ranges between 160 and 180 µm, typically is about 170 µm. The dielectric substrate thickness influences the quality of the information (e.g. axial resolution) that may be obtained from a sample depending of parameters such as objective NA and where appropriate immersion medium. A skilled man in the art may easily adapt thickness according to its goal and the parameters mentioned above.

Advantageously, the dielectric substrate measures about the width and, the length and the thickness of a microscope coverslip, preferably a fluorescent microscope coverslip.

Advantageously, the dielectric substrate is in the form of a circular coverslip, for example in the form of a circular coverslip having a diameter ranging from 50 µm to 3, 5, 10, 12, 15, 18, 20, 25, 60 mm, or 100 mm, preferably a diameter of about 100 µm, 10 mm, 12 mm, 18 mm or 25 mm.

Advantageously, the dielectric substrate is in the form of a rectangular coverslip, for example a rectangular coverslip having a length and/or width ranging from 50 µm to 3, 5, 10, 12, 15, 18, 20, 25, 60 mm, or 100 mm for example in the form of a rectangular coverslip having a size of 3×3 mm.

Advantageously, the dielectric substrate is made of an optical-grade material. Such optical-grade material may be selected from optical quality glass (such as soda lime glass or borosilicate glass) or optical quality plastic. Fused quartz or sapphire material may also be used. Preferably, said material is made of a material having a refractive index of at least 1.5, preferably is made of a refractive index ranging between 1.5 and 2.5, more preferably ranging between 1.5 and 2.3.

In an embodiment, the dielectric substrate is made of glass having a refractive index ranging between 1.50 and 1.55, preferably a refractive index of about 1.52. In another embodiment, the dielectric substrate is made of sapphire having a refractive index ranging between 1.78 and 2.3.

Interface

The interface between said dielectric substrate and said at least one spacer layer mimics an interface between a dielectric substrate and a sample to be tested. This is advantageously achieved when the optical-grade polymers used in the calibration standard have a refractive index approximating that of the sample to be tested. Preferably, such polymers have a refractive index between ranging between 1.3 to 1.8, preferably 1.3 to 1.6, more preferably between 1.33 and 1.51, even more preferably between 1.37 to 1.51.

Spacer Layer

The spacer layers are useful for adjusting the distance between the at least one fluorescent emitter layer and the interface of the calibration standard which mimics the interface between an interface between a dielectric substrate and a sample to be tested.

Advantageously, the spacer layer is made of material chosen among optical-grade transparent polymer mentioned above, or inorganic transparent optical-grade material, e.g., $TiO_2$.

Preferably, the refractive index of spacer layers approximates the refractive index of the sample to be tested. More preferably, the refractive index of spacer layer approximates the refractive index of cells, advantageously the refractive index of spacer layer ranges between 1.3 to 1.8, preferably 1.3 to 1.6, advantageously 1.3 to 1.5, more preferably between 1.33 and 1.51, even more preferably between 1.37 to 1.51.

When the calibration standard comprises a plurality of spacer layers, the spacers layers are advantageously made of the same material.

Advantageously, the spacer layer stacked on the dielectric substrate has a thickness of 2 nm or more, 3 nm or more, 4 nm or more, 5 nm or more. More advantageously, the spacer layer stacked on the dielectric substrate has a thickness ranging between 5 and 50 nm, preferably between 5 and 20 nm.

Advantageously, each spacer layers spacing two fluorescent emitter layers has a thickness of 2 nm or more, 3 nm or more, 4 nm or more, 5 nm or more. More advantageously, the spacer layer spacing two fluorescent emitter layers has a thickness ranging between 2 nm and 1000 nm, between 2 nm and 700 nm, between 2 nm and 500 nm, between 2 nm and 100 nm, between 2 nm and 50 nm, between 5 and 50 nm, preferably between 5 and 20 nm.

Fluorescent Emitter Layer

Advantageously, a fluorescent emitter layer contains a fluorescent emitter material and a polymer layer.

In an embodiment, the fluorescent emitter material layer is embedded within said polymer layer, advantageously homogenously embedded within said polymer layer. In this embodiment, the polymer layer in which the fluorescent emitter material is embedded is made of polymer chosen among optical-grade transparent polymers mentioned above, such as PDDA.

In another embodiment the fluorescent emitter material is stacked on said polymer layer. In this embodiment, the polymer layer on which the fluorescent emitter material is stacked acts as an underlayer. Thus, in this embodiment, the fluorescent emitter layer is composed of a fluorescent emitter material layer stacked on a spacer layer acting as an underlayer. In this embodiment, the underlayer exerts an adhesion force on the fluorescent emitter material of the fluorescent emitter layer. The adhesion force may be due to mechanical interlocking of the underlayer and the fluorescent emitter layer, to non-specific forces (e.g. Van der Waals forces between the polymer constituting the underlayer and the fluorescent emitter material), electrostatic forces (e.g. the atoms/molecules of the polymer constituting the underlayer and the fluorescent emitter material form electrostatic bonds) or chemical forces (e.g. the atoms/molecules of the polymer constituting the underlayer and the fluorescent emitter material form chemical bonds that can be of hydrogen, ionic or covalent character). Preferably, the polymer exerting an adhesion force (e.g. electrostatic adhesion force) on the fluorescent emitter material is an optical-grade transparent polymer such as PDDA or PSS.

In a specific embodiment, the fluorescent emitter layer is disposed between two layers each exerting an adhesion force on the fluorescent emitter layer.

Advantageously, the thickness of polymer layer acting as an underlayer ranges between 0.5 nm to 2 nm, preferably is about 1 nm. Advantageously, the thickness of the fluorescent emitter material layer ranges from 0.5 nm to 2 nm, preferably is about 1 nm.

Advantageously, the fluorescent emitter material is chosen among fluorescent emitter material mentioned above. Preferably, the fluorescent emitter material is chosen among molecular fluorophore, molecular fluorophore aggregates, fluorescent proteins, or fluorescent nanocrystals such as quantum dots.

Advantageously, the thickness of an fluorescent emitter layer ranges between 1 nm to 1000 nm, more preferably ranges between 1 and 800 nm.

Final Protective Layer

Advantageously the layered structure is covered with a spacer layer as a final protective layer.

Advantageously, the spacer layer is made of polymer chosen among optical-grade transparent polymers mentioned above preferably is made of the same polymer of which the spacer layer stacked on the dielectric substrate is made.

Layered Structure Whole Thickness

In an embodiment, the whole thickness of the layered structure is no more than 5 μm, advantageously no more than 2 μm.

In another embodiment, the whole thickness of the layered structure is submicrometric.

In another embodiment, the whole thickness of the layered structure ranges between 50 nm and 1 μm, 50 nm and 500 nm, 50 and 200 nm, 100 and 500 nm.

Calibration Standard Preparation

Another aspect of the invention is to supply a method for manufacturing a calibration standard according the invention, said method comprising forming on a dielectric substrate a layered structure, said layered structure comprising at least one spacer layer and at least one fluorescent emitter layer containing at least an fluorescent emitter material, wherein said layers are deposited one above another by techniques selected among spin-coating, layer-by-layer (LBL), Langmuir-Blodgett method, and evaporation.

Advantageously, the method for manufacturing a calibration standard according to the invention comprises the following steps:
i. providing a dielectric substrate;
ii. depositing once or several times a spacer layer and a fluorescent emitter layer of the invention; and
iii. optionally, depositing a final protective layer.

Step (ii)

Advantageously, the depositing of spacer layers in step (ii) is carried by spin coating and optionally LBL deposition or sputtering (in the case of inorganic oxides).

Spin coating and LBL deposition are thin film fabrication techniques well known to those skilled in the art. Thus, the skilled man in the art may manufacture a calibration standard according to the invention knowing the layered structure (e.g. the layer thicknesses and the layer compositions) to be deposited.

$1^{st}$ Implementation: Step (ii) Fluorescent Emitter Layer Deposition by Spin Coating In a first implementation, the fluorescent emitter layer to be deposited is composed of an fluorescent emitter material embedded within a polymer layer. In this embodiment, the fluorescent emitter layer deposition in step (ii) is advantageously carried by spin coating.

2nd Implementation: Step (ii) Fluorescent Emitter Layer Deposition Applying Layer-by-Layer (LBL) Technique.

In a second implementation, the fluorescent emitter layer to be deposited is composed of an fluorescent emitter material stacked on a polymer layer acting as an underlayer. In this embodiment, the fluorescent emitter layer deposition in step (ii) is advantageously carried by layer-by-layer deposition.

In this implementation, the spacer layer deposition in step (ii) is advantageously carried out by spin coating.

Advantageously, the fluorescent emitter layers deposition in step (ii) consist of successively depositing a layer of an optical-grade polymer exerting an adhesion force on the fluorescent emitter material (e.g. an electrostatic adhesion force) such as PDDA or PSS, followed by a layer of fluorescent emitter material such as $TPPS_4$, optionally followed by a layer of an optical-grade transparent polymer exerting an adhesion force on the fluorescent emitter material (e.g. an electrostatic adhesion force) such as PSS.

Calibration Standard Preparation Examples

The chemicals used in the Examples were purchased from SIGMA-ALDRICH.

The following substrate has been used:
borosilicate (BK-7) substrate with refractive index, $n_3=1.514$ at 488 nm.

The following polymers have been used:
Poly(2,2,3,3,3-pentafluoropropyl methacrylate)—(PFA);
Polydiallyldimethylammonium—(PDDA);
Polystyrene sulfonate (PSS); and
Poly venyl alcohol (PVA).

The following fluorescent emitters have been used:
J-aggregate of meso-tetra(4-sulfonatophenyl)porphine ($TPPS_4$);
Tetraphenylporphinetetrasulfonate ($TPPS^{4-}$, or "Base TPPS"); and
CAS No 1461-15-0 (calcein).

Unless stated otherwise, all the materials were used as received from the manufacturers.

The calibration samples were characterized by:
Ellipsometry, to measure layer thicknesses.

Example 1: Preparation of a Single-Fluorescent Emitter Layer Calibration Sample 1 (Sample 1) According to the Invention

1.1 Material and Methods

The material used for the manufacturing of the Spacer/capping layer A is prepared by dissolving 0.015 mM PFA in THF.

The material used for the manufacturing of the Spacer/capping layer B is prepared by dissolving 0.3 mM PFA in THF.

The material used for the manufacturing of the fluorescent emitter layer (e) is prepared by dissolving of 1 mM $TPPS_4$ in DI water, pH=3.

A BK-7 #1.5 (170 μm) coverslip was cleaned using Elmanex/DI water (1:10) for 20 min in sonicator and then carefully rinsed with DI water for at least 30 sec. We found that this process was important for achieving homogenous thin films.

Thin-layer deposition was achieved by a combination of two different techniques:

For the spacer/capping layers (denoted A/B in FIG. 3-5) we used spin coating (5,000 RPM, 1 min), resulting in a thin layer of about 5-10 nm thickness for 0.015 mM PFA and 600 nm for 0.3 mM PFA (denoted layer B or D).

For the light-fluorescent emitter layer deposition we used the layer-by-layer (LBL) technique using the following solutions and the following sequence: PDDA (1:10), $TPPS_4$ and PSS (1:10), all in DI water. The sample was immersed in each one of the solutions for about 30 sec, resulting in an homogenous film of about 4-nm thickness.

1.2 Results

A single-fluorescent emitter layer calibration sample 1 as shown in FIG. 1 is obtained.

Minimal thickness of A is of the order of 5-10 nm, and different samples can be realized having different thickness of A (see below) e is about 4 nm, and B is about 600 nm.

The substrate is a BK-7 coverslip of about 170 μm thickness.

Example 2: Preparation of a Multi-Fluorescent Emitter Layer Calibration Sample 2 (Sample 2) According to the Invention

2.1 Material and Methods

Sample 2 was fabricated as Sample 1, but with additional layers as described in the FIG. 5. For the fluorescent emitter layers (e1, e2, e3) we follow the same procedure as before as well as for the spacer/capping layer. For the last capping layer D, we used 0.2 mM PFA.

All fluorescent emitters (e1, e2, and e3) are excited with laser excitation wavelength of 488 nm. Their emission wavelengths are different and are mentioned in the table below.

| dye | Excitation wavelength (max) | Emission Wavelength (max) | Solvents |
|---|---|---|---|
| Base TPPS | 520 nm/415 nm | 645 nm Orange-red | Water PH > 6 |
| TPPS J-aggregate | 490 nm | 720 nm (red) | Water PH < 2, or PH < 4 with 10-4M KCl |

-continued

| dye | Excitation wavelength (max) | Emission Wavelength (max) | Solvents |
|---|---|---|---|
| Calcein | 480 nm | 520 nm (green) | Water, DMF, etOH |

Calcein

2.2 Results

A multi-fluorescent emitters calibration sample 2 was obtained. A, B, C and D are composed of an optical transparent polymer layer with thicknesses of A=5 nm-20 nm, B, C=50 nm-80 nm and D is about 400 nm-600 nm, the fluorescent emitters layer e1, e2 and e3 thicknesses are about 2 nm-20 nm. The whole sample thickness, d, is about 800 nm. The fluorescent emitters e1, e2 and e3 have different emission spectra.

Example 3: Preparation of a Thick-Fluorescent Emitter Layer Calibration Sample (Sample 3) According to the Invention

3.1 Material and Methods

Sample 3 (FIG. 4) was fabricated as Sample 1, except that the fluorescent emitter (TPPS$_4$), was embedded in PVA (100 mg in 2 ml DI water) and then was spin coated for 1 min, 800 RPM.

3.2 Results

A thick fluorescent emitter layer (about 800 nm) calibration sample 3 was obtained. Thin spacer A is as in Example 1 and 2.

Determining an Information Related to an Evanescent Field

Another aspect of the invention is a method for determining an information related to an evanescent field generated close to an interface between a sample to be tested and a dielectric substrate on which said sample is to be deposited, and/or for adjusting said information; comprising:
  a) providing at least one calibration sample
  b) placing said calibration standard on a microscope stage,
  c) illuminating said calibration standard at a given wavelength ($\lambda$) and a given angle of incidence ($\theta(2)$),
  d) detecting the emission of the at least one fluorescent emitter material contained in the at least one fluorescent emitter layer, said detection being used for the determination of an information related to said evanescent field.

The illumination of step c) is advantageously carried out with a wavelength able to excite the fluorescent emitter material of each of the n calibration standard. This may be obtained by illuminating the calibration standard with a wavelength overlapping with the fluorescent emitter excitation spectrum, for example using a laser source or a white light source with an adequate excitation filter.

The detection step d) advantageously comprises measuring the value of at least one fluorescence parameter of the at least one fluorescent emitter layer detected emission that varies as a function of the evanescent field intensity, such as fluorescent emitter layer emission intensity, fluorescent emitter layer emission wavelength, fluorescent emitter layer polarization, fluorescent emitter layer directionality or fluorescent emitter layer fluorescence life time, fluorescent emitter layer emission radiation pattern.

Determination of an Evanescent Field Axial Intensity Decay

1$^{st}$ Implementation: One Fluorescent Emitter Layer

In an embodiment, the information to be determined is the characterization of evanescent field axial intensity decay. Such information may be obtained implementing a method comprising:
  Providing n calibration standards comprising a single fluorescent emitter layer each having fluorescent emitter layers arranged at different fixed controlled distances ($z_n$) relative to the interface,
  for each calibration standard, illuminating the calibration standard and measuring fluorescence parameters ($M_n$) for at least one physical parameter that varies as a function of the evanescent field intensity;
  outputting an information characterizing the evanescent field intensity decay,
  wherein the information describes the relationship between the at least one measured physical parameters ($M_n$) obtained with each calibration standard comprising a single fluorescent emitter layer and the fixed controlled distances ($z_n$).

TIR

In an embodiment, each calibration standard is illuminated in TIR conditions. In particular, the calibration standard is illuminated with an angle of incidence ($\theta(2)$) greater than the critical angle ($\theta(c)$) and the measurement performed in the front focal plane.

In this embodiment, the measured physical parameters ($M_n$) obtained with a calibration whose fluorescent emitter layer is at a distance ($z_n$) from the interface may be normalized by ($M_{n,EPI}$), with ($M_{n,EPI}$) representing the measured fluorescence parameter obtained with the same calibration standard with a ($\theta(2)$)=0. The ratio $(M_n)/(M_{n,EPI})$ represent the normalized measured fluorescence parameters.

Further, in this embodiment, ($M_n$) may be obtained at various angle of beam incidence $\theta(2)$.

In this embodiment, the measured fluorescence parameters ($M_n$) or the normalized measured fluorescence parameters $(M_n)/(M_{n,EPI})$ may be graphed as a function of ($z_n$).

A function may be fitted with the obtained measured fluorescence parameters ($M_n$) or the normalized measured fluorescence parameters $(M_n)/(M_{n,EPI})$ to obtain a set of parameters, describing the intensity decay. As a result of the fitting step, a set of parameters describing the intensity decay are obtained. This function may typically be a double exponential, in which the term with the shorter decay length corresponds to the evanescent part in excitation light and the decay length is the effective penetration depth, and the longer-range part is a non-evanescent excitation component. Apart from the two length constants (a short and a long exponential decay length), the relative weight of the two functions is used to estimate the proportion of evanescent vs. propagating excitation light. The fitting is not restricted to double exponentials and other functions such as exponentials, stretch exponentials, or other can be used, too.

Preferably, the fluorescence parameter that varies as a function of the evanescent field intensity is selected from fluorescent emitter layer emission intensity, fluorescent emitter layer polarization, fluorescent emitter layer directionality, fluorescent emitter layer fluorescence life time, and fluorescent emitter layer radiation pattern.

SAF

In another embodiment, each calibration standard is illuminated and fluorescence collected in SAF conditions. This embodiment uses imaging of the Fourier plane (pupil plane) of the objective rather than the sample plane, and analyzing the radiation pattern obtained.

The radiation pattern may be imaged by placing a Bertrand lens in the detection optical path, so that the objective back-pupil plane rather than the sample plane is imaged. In this embodiment, the fluorescent emitter layer distance (z) advantageously correspond to a parameter, distance-dependent radiation pattern.

In this embodiment, the measured fluorescence parameters ($M_n$) obtained with a calibration whose fluorescent emitter layer is at a distance ($z_n$) from the interface are the amount of supercritical fluorescence ($M_{n,SAF}$) and subcritical (or under-critical) fluorescence ($M_{n,UAF}$).

In this embodiment, the ratio n $(M_{n,SAF})/(Mn,_{UAF})$ may be used graphed as a function of ($z_n$).

As mentioned above, a function may be fitted with the ratio $(M_{n,SAF})/(Mn,_{UAF})$ to obtain a set of parameters describing the intensity decay. As a result of the fitting step, a set of parameters describing the intensity decay are obtained. This function may typically be a single exponential.

In a more elaborate implementation, the radiation pattern of a homogenous layer of isotopically oriented fluorescent emitters is simulated and this simulated radiation pattern fitted with the measured radiation pattern, with the fluorescent emitter distance z(0) as fit variable.

Thus, the methods detailed above permit to determine relationship between the at least one measured fluorescence parameters ($M_n$) and the fixed controlled distances ($z_n$) with regard to an evanescent field generated close to an interface between a sample to be tested and a dielectric substrate on which said sample is to be deposited. This information is important as it allows a good estimation the thickness of the fluorescence excitation layer from a corresponding a real cell/substrate interface illuminated in the same conditions.

As mentioned above, the fluorescence parameter that varies as a function of the evanescent field intensity may be selected from fluorescent emitter layer emission intensity, fluorescent emitter layer polarization, fluorescent emitter layer directionality, fluorescent emitter layer fluorescence life time, and fluorescent emitter layer radiation pattern.

$2^{nd}$ Implementation: Plurality (Series) of Fluorescent Emitter Layers

In another embodiment, the evanescent field axial intensity decay may be obtained using calibration standard comprising a plurality of fluorescent emitter layers. This embodiment is particularly advantageous, as—unlike in the case of a single-fluorescent emitter—the method below allows fast and instantaneous measurements to get the desired information relative to the evanescent field. Such method may be obtained implementing a method comprising:

Providing one calibration standards comprising m fluorescent emitter layers each having fluorescent emitter layers arranged at different fixed controlled distances ($z_m$) relative to the interface, for said calibration standard measuring the fluorescence parameter (M) that varies as a function of the evanescent field intensity;

outputting an information characterizing the evanescent field intensity decay, wherein the information describes the relationship between the at least one measured fluorescence parameters ($M_m$) obtained with the calibration standard comprising a plurality of fluorescent emitter layers and the fixed controlled distances ($z_m$).

In this embodiment, the fluorescence parameters, may be collected in the form of a mixed information. For example, if fluorescent emitter layer emission intensity is measured, the emission is collected in the form of multiple spectral bands corresponding to a certain combination of spectral intensities.

Thus, in this embodiment, the fluorescence parameter measurement (M) may be used to back-calculate the contribution of each fluorescent emitter layer, advantageously using the formula that relates the contribution of a fluorescent emitter layer to some parameters of the fluorescent emitter material it contains (e.g. concentration, brightness, excitation efficiency) and the detector spectral sensitivity.

In a particular embodiment the contribution of a fluorescent emitter layer is back-calculated using the product of fluorescent emitter concentration*fluorescent emitter brightness*excitation efficiency*detector spectral sensitivity. In other terms, the relative weight of each fluorescent emitter layer corresponds to the product of the fluorescent emitter concentration*fluorescent emitter brightness*excitation efficiency*detector spectral sensitivity.

As used herein, fluorescent emitter brightness represents the product: molar extinction*fluorescence quantum yield.

As mentioned above, linear terms can be cancelled out by normalizing the intensities measured upon TIR with the corresponding intensities measured in EPI, and the (non-linear) spectral unmixing gives the axial decay of the excitation light distribution from a single spectral measurement.

Alternatively, as in the embodiment using a single-fluorescent emitter calibration standard, not only the spectral intensities but also the fluorescent emitter radiation pattern can be analyzed. Moreover, other readouts varying as a function of the evanescent field intensity, including the polarization of the emitted fluorescence or the fluorescence lifetime can be easily used by the skilled in the art to implement the methods described above.

Adjustment of an Information Related to the Evanescent Field

The method may further comprise a step wherein the information determined as detailed above is adjusted.

Such embodiment comprises adjusting the wavelength ($\lambda$) and/or angle of incidence ($\theta(2)$), of the light illuminating the calibration standard so that the measured fluorescence parameter corresponds to a desired value of evanescent field penetration depth.

Computer Program

In a further aspect, the invention relates a computer program comprising instructions of codes for the execution of steps of the method for determining an information related to an evanescent field, when said program is run on a computer.

In this aspect, the computer is preferably connected to a microscope arrangement and is preferably configured to output at least one mean for measuring a fluorescence parameter.

In a preferred embodiment, the computer program comprises instructions of codes for the execution of steps of the method using calibration standard comprising a plurality of fluorescent emitter layers, wherein the instructions of codes are adapted to execute a back-calculating step when said program is run on a computer.

Illumination Set-Up

In one embodiment corresponding to a TIR set-up, the calibration standard is illuminated in such a way that the medium of illumination incidence is the calibration standard surface having the greater refractive index (i.e. the dielectric substrate surface on which no layered structure has been stacked). In this embodiment, the calibration standard is advantageously illuminated with an angle of incidence ($\theta(2)$) greater than the critical angle ($\theta(c)$).

In another embodiment corresponding to a SAF set-up, the calibration standard may be illuminated in such a way that the medium of illumination incidence is either the calibration standard surface having the greater refractive index (i.e. the dielectric substrate surface on which no layered structure has been stacked) or the lower refractive index (i.e. the dielectric substrate surface on which layered structure(s) have been stacked).

Calibration Standard Support

In an embodiment, the calibration standard is placed on the microscope stage using a calibration standard support in the form and/or thickness of a microscope slide.

This support comprises a base part defining a through opening allowing an illuminating beam from the exterior of support to pass through the opening. Moreover, the opening is sized so as to receive a calibration standard. The through opening may be bordered by walls acting as stops for stopping a displacement of the calibration standard relative to the calibration standard support. The calibration standard may be simply laid on the support or bonded to it.

The calibration standard support advantageously permits to handle the calibration during assays and to store the calibration standard.

Advantageously, the calibration standard support measures about the width and length of a microscope slide, typically about 75 mm by 25 mm, or 76×26 mm. The calibration standard support may measure a range of sizes corresponding to microscope slide used in special purposes, such as 75×50 mm and for geological use, 46×27 mm for petrographic studies, and 48×28 mm for thin sections, among others.

The calibration standard support is advantageously thicker than the calibration standard, for example is about or more than 0.6 mm, preferably is about or more than 1 mm. The base part may be made of any solid material, such as glass, plastic or metal.

Figure 6:
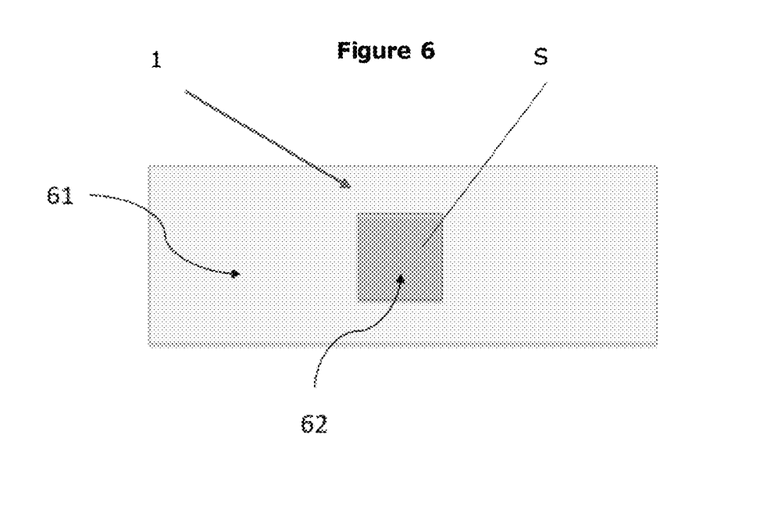
FIG. 6 is a schematic representation of a calibration standard packaged in a larger (microscope-side sized) calibration standard support.

Such a calibration standard support is illustrated on FIG. 6. The calibration standard (62) on which measurements are realized measures has a rectangular form having a length and a width about 12 mm to 25 mm and a thickness about 170 μm, while the calibration standard support (61) measures about the width and length of a microscope slide, typically about 75 mm by 25 mm and is about 1 mm thick, allowing for better handling than if the calibration standard was manipulated without support.

CALIBRATION STANDARD USE EXAMPLES

Example 1: Protocol of Typical Measurement with Type-1 Sample (Single Homogenous Dye Layer)

1. Material and methods
1.1 Control in epifluorescence (EPI)
1.1.1 mount sample on microscope;
1.1.2 chose laser wavelength or white light source with matching excitation filter overlapping with fluorophore excitation spectrum;
1.1.3 chose matching dichroic mirror and emission filter;
1.1.4 focus at interface layer;
1.1.5 take in-focus plane image of the calibration sample (see FIG. 7).
1.2 Variable-angle TIRF image acquisition
1.2.1 switch to evanescent-wave (TIRF) excitation;
1.2.2 refocus (note focus w/respect to EPI);
1.2.3. starting with theta=0° (which should be identical to EPI), take TIRF images at different polar beam angles (the setup must be calibrated so that the angle of the incoming beam with respect to the optical axis is known to 0.5° max);
1.2.4 acquire variable-angle TIRF image series;
1.2.5. repeat step (1.2.4) at 5-10 different locations on the sample;
1.2.6 chose regions of interest (ROIs) on sample;
1.2.7 take ten dark images of the same sample (with laser shuttered), average to constitute average dark image.
  1.3 Image Analysis
1.3.1 subtract local background measured on average dark image
1.3.2 plot, for each ROI n, the background-subtracted signal (F-B)(n) vs. beam angle theta
1.3.3 fit graph with analytical expression of signal vs angle
1.3.4 repeat steps 1.1-1.3.3 for samples with different spacer layers separating the glass substrate and dye layer, z(m) denoting m different spacer thickness;
1.3.5 for a given beam angle, graph (F-B)(n) vs. z(m);
1.3.6 fit a double exponential with the data. The short-range exponential will give the effective penetration depth, the long-range exponential the (unwanted) non-evanescent, far-field contribution, respectively.

The weights (pre-exponential factors) of the two mono-exponential terms will give the relative contribution of evanescent and non-evanescent light.

Results

Figure 7:
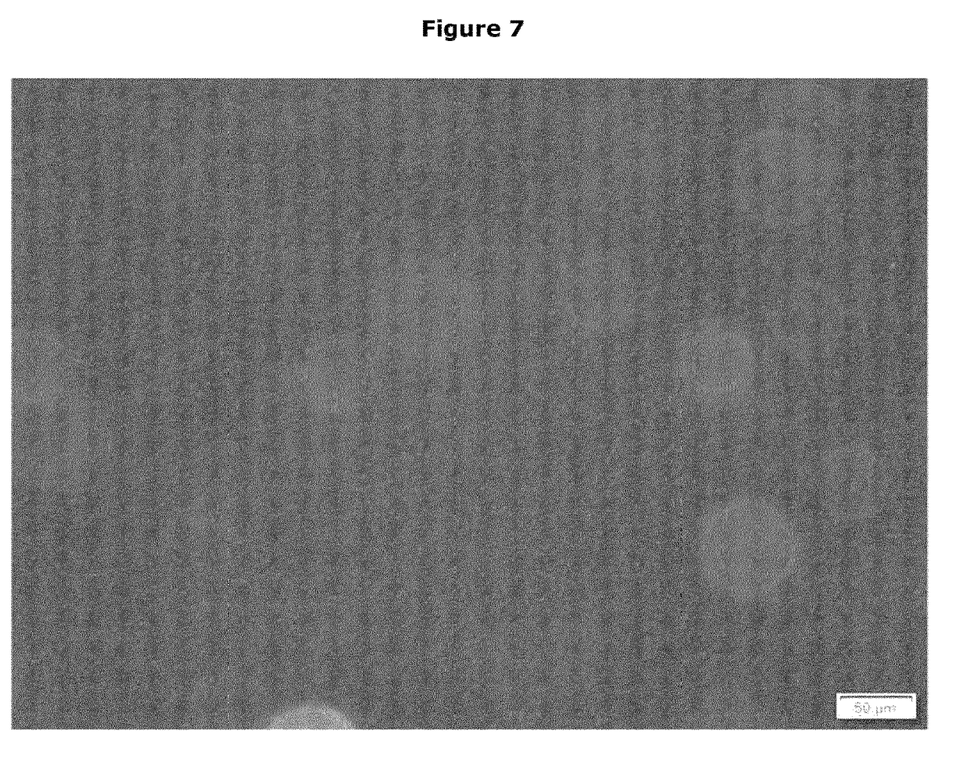
FIG. 7 illustrates an epifluorescence sample-plane image obtained with a spin-coated single-J-aggregate, single-layer sample (on top a 50-nm spacer layer), upon 488-nm excitation, seen through a 491 nm dichroic mirror and 525/40 emission band-pass filter to illustrate the homogeneity over a large surface area.

FIG. 7 illustrates an Epifluorescence sample-plane image of spin-coated single-J-aggregate, single-layer sample (on top a 50-nm spacer layer), upon 488-nm excitation, seen through a 491 nm dichroic mirror and 525/40 emission band-pass filter.

Example 2: Variant Protocol for «Semi-Infinite» Dye Layer

Simpler than the above 3-D samples, topping a coverslip with a dilute fluorophore solution and thus generating a layer of 'infinite' thickness (d>>δ) creates a homogenous sea of fluorescence that can be used in conjunction with VA-TIRF to estimate the effective penetration depth from the variation of the cumulative fluorescence. Assuming a mono-exponentially decaying EW with a decay length δ(θ) and a long-range component with D>>δ the superposition of two exponentials, $$F(z) = A \cdot e^{-z/\delta(\theta)} + B \cdot e^{-z/D} \quad \text{(Eq. 1)}$$

describes the axial intensity decay. Here, we assumed that D is only slowly varying with θ, if at all. After integration over z in the bounds [0, ∞], eq.3 yields a linear dependence of the measured fluorescence on δ(θ), $$F_{tot} = A \cdot \delta(\theta) \cdot \left(1 - e^{-\frac{z}{\delta(\theta)}}\right) + B \cdot D \cdot \left(1 - e^{-\frac{z}{D}}\right) \approx A \cdot \delta(\theta) + B, \quad \text{(Eq. 2)}$$

because the second term is an angle-independent offset. If eq.4 is normalized for the θ-dependence of the incident intensity at the interface, $I_0(z=0)$, e.g., by recording $F_0(\theta)$ of a thin fluorophore film at the interface, then the implicit θ-dependence of A and B is cancelled out. Of course, for the integral to solve as stated, one here assumes that the θ-dependent term of the intensity decay follows a mono-exponential.

Example 3: Variant Protocol Using SAF Detection

A variant of the above protocol uses imaging of the Fourier plane (pupil plane) of the objective rather than the sample plane, and analyses the radiation pattern rather than the absolute intensity,
1.5.1 Mount Bertrand lens in the emission optical path;
1.5.2 verify, for a glass/air interface the expected radiation pattern for a thin dye layer, directly spin-coated on the surface (FIG. 8a);
1.5.3 switch to the test sample as in 1.1 and—using same filters and settings as above—acquire SAF image of dye embedded spacer and capping layers of index-matched polymer;
1.5.4 for different fluorophore heights z(m) take SAF images;
1.5.5 same as 1.5.4, for different beam angles theta (n);
1.5.6 same as 1.5.5, for different areas of polymer NOT containing dye layer;
1.5.7 Integrating the intensity within the yellow circle (undercritical angle fluorescence, UAF) and within the circular aperture defined by the yellow and purple rings;
1.5.8 SAF should increase with decreasing fluorophore height z(m) and reach zero for z roughly 1 μm. Plot SAF/UAF intensities as z(m);
1.5.9 SAF should not vary for different beam angles theta(n) (CONTROL);
1.6.0 Fit a single exponential with SAF/UAF vs. z(m) data. Get effective penetration depth.

Figure 8A:
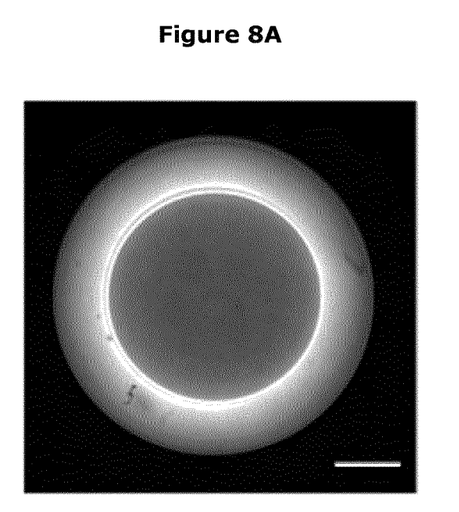
FIGS. 8A and 8B show experimental radiation patterns of thin fluorophore layers, either for a glass/air interface (a), or for an interface of glass and same dye embedded in a medium having a refractive index close to water (1.33).
Figure 8B:
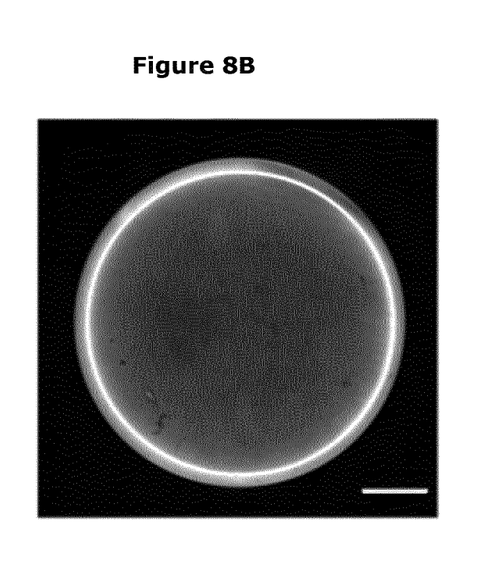

Results:
The results are illustrated on FIG. 8A and FIG. 8B. FIG. 8A and FIG. 8B show experimental radiation patterns of thin fluorophore layer, either for a glass/air interface (A), or for a interface of glass and same dye embedded in a medium having a refractive index close to water (B). Note the emission into higher angles, leading to a larger bright circle.

FIG. 8B shows a typical result, as one can see the 'halo' of supercritical angle fluorescence (SAF) emanating into 'forbidden' angles beyond the white line, captured by the high-numerical aperture objective (the outer limit corresponds to the limiting NA of the objective).

For the triple color sample, these steps, described here for m different samples are multiplexed (m=3) on one coverslip, allowing for a single-shot measurement.

The invention claimed is:

1. A calibration standard for determining an evanescent field axial intensity decay related to an evanescent field generated close to an interface between a sample to be tested and a substrate on which said sample is to be deposited, said calibration standard comprising one layered device stacked on a dielectric substrate, an interface between said dielectric substrate and said layered device mimicking an interface between the dielectric substrate and a sample to be tested,
   the layered device presents on said dielectric substrate, a surface, and comprises:
      a series of layered structures stacked on the dielectric substrate, one above to the other,
      each layered structure comprising: one spacer layer being transparent, and one fluorescent emitter layer containing at least one fluorescent emitter material;
      said dielectric substrate is of a higher refractive index than the spacer layers;
      a first spacer layer being in contact with the dielectric substrate and being transparent, to present a flat surface on which the stack of the layered structures is deposited; and
      a final emitter layer being covered with a final protective layer being transparent,
   wherein:
      each layer has a respective constant thickness over the surface;
      each fluorescent emitter layer is arranged at a fixed controlled axial distance of said interface,
      each fluorescent emitter layer comprises at least one fluorescent emitter material having at least one fluorescence parameter different from the fluorescent emitter material of another fluorescent emitter layer, wherein said at least one fluorescence parameter is emission wavelengths, emission directionality, emission polarizabilities or fluorescence lifetimes,
      each fluorescent emitter layer has a specific fluorescence parameter at a fixed controlled axial distance of the interface, at a common excitation wavelength,
      the device comprises at least one of the one spacer layers being disposed between the first spacer layer and the final protective layer;
      the first spacer layer is thinner than the at least one of the one spacer layers, and
      the at least one of the one spacer layers is thinner than the final protective layer,
      to determine the evanescent field axial intensity decay from the combination of these specific fluorescence parameters measured at different controlled axial distances of the interface.

2. The calibration standard according to claim 1, wherein the thickness of the series of the layered structures is of the same length scale as the evanescent-field intensity decay.

3. The calibration standard according to claim 1, wherein:
each fluorescent emitter layer having an excitation spectrum permitting excitation at the same excitation wavelength,
so that each fluorescent emitter layer having a specific spectral intensity at a fixed controlled axial distance of the interface, at a common excitation wavelength,
to determine the evanescent field axial intensity decay from the combination of these specific spectral intensities measured at different controlled axial distances of the interface.

4. The calibration standard according to claim 1, wherein:
each fluorescent emitter layer presents a constant fluorophore concentration over the surface, and
each spacer layer presents a constant refractive index over the surface.

5. The calibration standard according to claim 1, wherein an intermediate capping layer is deposited between each emitter layer and each adjacent spacer layer.

6. The calibration standard according to claim 5, wherein the intermediate capping layer has a thickness no more than 5 nm.

7. The calibration standard according to claim 1, wherein each layer is deposited by:
spin coating;
Layer By Layer (LBL) deposition; or
sputtering.

8. The calibration standard according to claim 1, the layered device having a thickness between 400 nm and 5 micrometers.

9. The calibration standard according to claim 1, wherein each of the spacer layers has a thickness ranging from 1 nm to 1000 nm.

10. The calibration standard according to claim 1, wherein each of the fluorescent emitter layers has a thickness ranging from 2 nm to 30 nm.

11. The calibration standard according to claim 1, wherein some fluorescent emitter layers have a thickness no more than 2 nm.

12. The calibration standard according to claim 1, wherein the final protective layer has a thickness in a range of 400-800 nm.

13. The calibration standard according to claim 1, wherein the more fluorescent emitter layer is distant from the interface, the more this emitter layer is fluorescent.

14. The calibration standard according to claim 1, wherein the fluorescent emitter material contained in fluorescent emitter layers have different emission wavelengths.

15. The calibration standard according to claim 1, wherein each spacer layer and the final protective layer are made of an optical-grade transparent polymer or optical-grade transparent inorganic oxide, having a refractive index between 1.3 and 1.8.

16. The calibration standard of claim 15, wherein each spacer layer and the final protective layer are made of the same material.

17. The calibration standard according to claim 1, wherein the fluorescent emitter layer comprises one fluorescent emitter material and one polymer layer,
wherein said fluorescent emitter material is either embedded within said polymer layer or wherein said fluorescent emitter material is stacked on said polymer layer thereby acting as an underlayer.

18. The calibration standard of claim 1, wherein:
said fluorescent emitter material is chosen from:
organic fluorophores;
quantum dots; and
carbon dots.

19. A method for determining an evanescent field axial intensity decay related to an evanescent field generated close to an interface between a sample to be tested and a dielectric substrate wherein said sample is to be deposited, and/or for adjusting said evanescent field axial intensity decay; comprising:
a) providing at least one calibration sample of said calibration standard as defined in claim 1,
b) placing said calibration standard on a microscope stage,
c) illuminating said calibration standard at a given wavelength and a given angle of incidence, and
d) detecting the emission of the at least one fluorescent emitter material contained in each fluorescent emitter layer, said detection being used for the determination of an evanescent field axial intensity decay related to said evanescent field,
by the measure of a value of at least one fluorescence parameter of the said emission that varies as a function of the evanescent field intensity, wherein said at least one fluorescence parameter is fluorescent emitter material emission wavelength, fluorescent emitter material emission polarization, fluorescent emitter material emission directionality or fluorescent emitter material emission fluorescence life time.

20. The method according to claim 19, comprising:
providing the calibration standard as n calibration standards comprising a single fluorescent emitter layer, each fluorescent emitter layer arranged at different fixed controlled distances relative to the interface,
for each calibration standard, illuminating the calibration standard and measuring fluorescence parameters that vary as a function of the evanescent field intensity;
outputting the evanescent field intensity decay,
wherein the intensity describes a relationship between the at least one measured fluorescence parameters obtained with each calibration standard comprising a single fluorescent emitter layer and the fixed controlled distances.

21. The method according to claim 20, comprising:
providing the calibration standard comprising m fluorescent emitter layers, each having a fluorescent emitter layer arranged at different fixed controlled distances relative to the interface,
said calibration standard measuring the fluorescence parameters that vary as a function of the evanescent field intensity;
outputting the evanescent field intensity decay which describes the relationship between the at least one measured fluorescence parameters obtained with the calibration standard comprising a plurality of fluorescent emitter layers and the fixed controlled distances.

22. The method according to claim 19, wherein, further comprising:
adjusting the wavelength and/or angle of incidence, of the light illuminating the calibration standard so that the measured fluorescence parameter corresponds to a desired value of evanescent field intensity decay.

23. A non-transitory computer program product comprising instructions of codes that, when executed by a computer, perform the steps of the method according to claim 19.

24. The calibration standard of claim 1, wherein:
the first spacer layer has a thickness in a range of 5-20 nm,
the at least one spacer layer has a thickness in a range of 10-100 nm, and
the final spacer layer has a thickness in a range of 400-800 nm.

* * * * *